(12) United States Patent
Ishikawa

(10) Patent No.: US 6,213,755 B1
(45) Date of Patent: Apr. 10, 2001

(54) APPARATUS FOR MANUFACTURING A MOLDING CONTINUOUSLY

(75) Inventor: Hiroshi Ishikawa, Osaka (JP)

(73) Assignee: Kabushiki Kaisha Katsuron, Osaka (JP)

( * ) Notice: Subject to any disclaimer, the term of this patent is extended or adjusted under 35 U.S.C. 154(b) by 0 days.

(21) Appl. No.: 09/203,625

(22) Filed: Dec. 1, 1998

(30) Foreign Application Priority Data

Dec. 2, 1997 (JP) .................................................. 9-331895

(51) Int. Cl.⁷ .................................................. B29C 39/14
(52) U.S. Cl. ........................ 425/220; 425/223; 425/224; 425/362; 425/444; 425/453
(58) Field of Search ..................... 425/115, 116, 425/121, 122, 220, 223, 224, 362, 363, 575, 444, 577, 453

(56) References Cited

U.S. PATENT DOCUMENTS 2,929,793 * 3/1960 Hirsh ...................................... 521/73

* cited by examiner

Primary Examiner—James P. Mackey
Assistant Examiner—Donald Heckenberg
(74) Attorney, Agent, or Firm—Friedrich Kueffner

(57) ABSTRACT

A process and apparatus is provided for automatically and continuously producing a mass of moldings. A continuous molding is manufactured by injecting a solid solution in order of precedence into a plurality of molds circulating in a line along an endless track and by solidifying the injected solution. The solution is preferably vinyl chloride resin or another synthetic resin. After the solution solidifies the mold is automatically removed from the molding. The continuous molding consists of a number of moldings open at the bottoms and connected end to end by a top plate, molded at the same time.

12 Claims, 8 Drawing Sheets

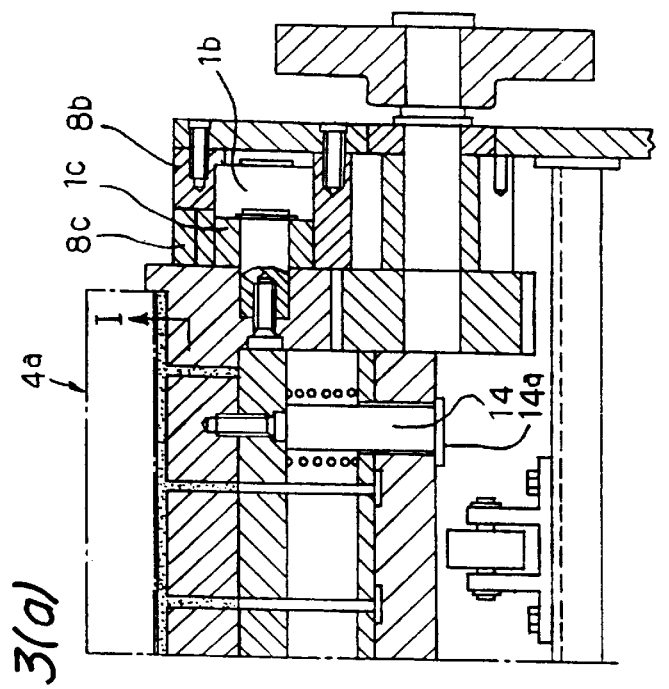
FIG.3(a)
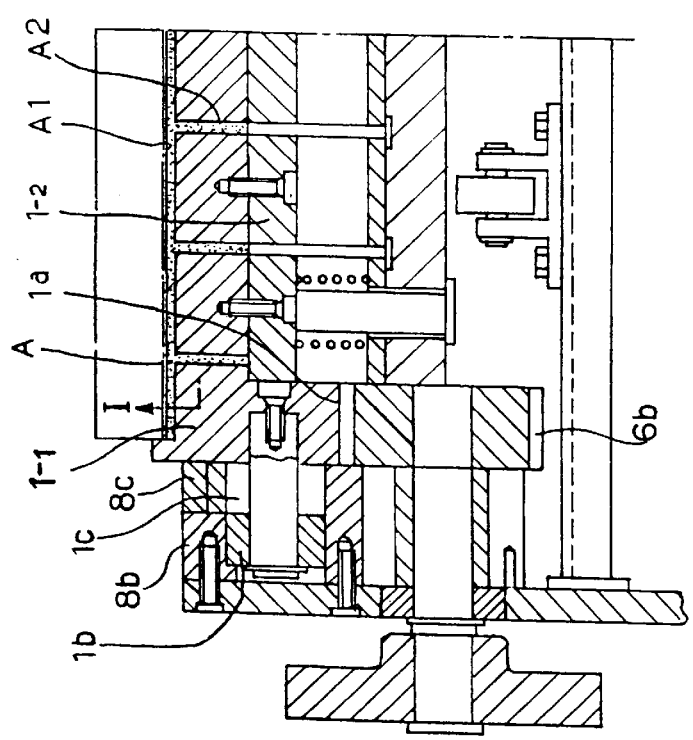
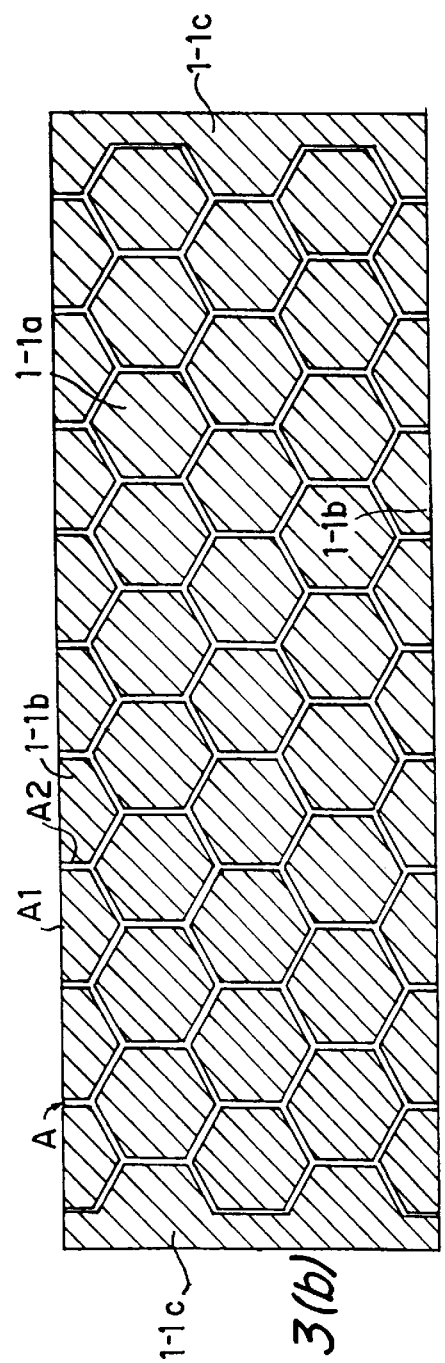
FIG.3(b)

APPARATUS FOR MANUFACTURING A MOLDING CONTINUOUSLY

BACKGROUND OF THE INVENTION

1. Field of the Invention

The present invention relates to a process and apparatus for continuously manufacturing a molding having a number of spaces closed at the top and open at the bottom.

2. Description of the Related Art

Conventional processes and apparatus for manufacturing honeycomb moldings which are open at the top include general injection molding processes and apparatus. The operation of processes and apparatus of this type is well known, simple, and follows a set procedure. These processes and apparatus make it possible to manufacture moldings reliably.

In some circumstances, there may be a need to manufacture large quantities of moldings relatively inexpensively in a very short period. In other words, the quantity, the delivery deadline, or the costs may take priority over the accuracy of the molding shape and size. In this case, it is difficult to manufacture moldings by the conventional processes and apparatus, and it is, therefore, necessary to consider the use of a mass production system for producing the moldings.

By way of example, a molding of the type which needs to be produced relatively cheaply in a very short period of time is a lawn protector. Lawn protectors have been receiving attention for some time. Lawn protectors are laid on a lawn parking lot. Cars can be parked on the protectors so that their tires do not press on the lawn directly. This protects the lawn and does not prevent it from growing. FIG. 2 of the accompanying drawings shows part of a honeycomb molding A, which is a lawn protector.

The need to manufacture a mass of such honeycomb moldings at high speed takes priority over the need to improve the accuracy of their shape and size. It is difficult to manufacture such moldings at high speed with the conventional injection molding systems. In order for a process or an apparatus to manufacture honeycomb moldings at high speed, it is necessary to introduce a continuous manufacturing system, which may be an extrusion molding system, in place of a conventional injection system.

SUMMARY OF THE INVENTION

It is an object of the invention to provide a process and an apparatus for automatically and continuously producing a mass of moldings without the disadvantages arising in the establishment of a mass production system using the conventional apparatus of injection molding systems. This is accomplished through a continuous manufacturing system using a solid solution extrusion system having a circulation system with molds.

In accordance with an aspect of the invention, a process is provided for manufacturing a continuous molding by injecting a solid solution in order of precedence into a plurality of molds circulating in a line along an endless track, and by solidifying the injected solution. The track includes a forward path and a backward path. The backward path extends substantially horizontally or slopes down under the forward path. The front end of the forward path is positioned just under the front end of the backward path. The rear end of the forward path is positioned just under the rear end of the backward path. The continuous molding consists of a number of moldings connected end to end by a molded top plate. The moldings are open at their bottoms. The process comprises the steps of:

injecting the solution into each of the molds moving along the forward path;

removing the continuous molding from each of the molds by displacing the mold down, little by little in order of precedence from the molding in close contact with the mold while the injected solution is solidifying;

moving from the front end of the forward path down to the front end of the backward path, the mold released from the removing step;

returning the mold along the backward path; and lifting the mold from the rear end of the backward path to the rear end of the forward path.

By injecting a solid solution from an extrusion type injector into the molds in order of precedence, this process can continuously manufacture a continuous molding consisting of a number of moldings open at the bottoms and connected end to end by a top plate, molded at the same time. As a result, it is possible to realize a mass production system, which can greatly lower the molding production costs.

In accordance with another aspect of the invention, an apparatus is provided for manufacturing a continuous molding continuously by injecting a solid solution in order of precedence into a plurality of molds circulating in a line along an endless track, and by solidifying the injected solution. Each of the molds includes a plurality of pins which can protrude up into cavities in the mold. The continuous molding consists of a number of moldings connected end to end by a molded top plate. The moldings are open at the bottoms. The apparatus includes:

conveying means for horizontally conveying the molds in close contact and in series along the track;

injecting means for injecting the solution into each of the molds moving forward along the track, the injecting means being positioned above the starting point where the conveying means starts conveying the molds;

a pressurizer for pressing the upper surface of the injected solution with a predetermined pressure to make the surface continuously flat, the pressurizer being positioned adjacently to and downstream from the injecting means;

guide means for guiding the molds gradually down by using the conveying force;

removing means for protruding the pins up as the molds are moving down; and circulating means for circulating to the starting point the molds removed from the molding.

This apparatus can implement the foregoing process securely. The apparatus includes molds of the same shape. By circulating the molds, the apparatus can make a molding continuously. This makes the molding production costs relatively low. While the guide means is moving each of the molds gradually down, the pins protrude up into the cavities in the mold to remove the molding already cooled and solidified in the mold. This makes the removal secure.

It is preferable that each of the molds include guide rollers which can be guided by the guide means in such a manner that, while the mold is moving forward along the guide means and gradually down out of close contact with the molding, the mold is kept horizontal. This enables the locus of the mold moving during the removing step to be limited to the horizontal (direction) by the synthesis of the substantially horizontal movement and vertical movement of the mold. The position of the mold can, therefore, be kept always horizontal, although it tends to tilt.

If a mold tilted when the injected solution in it has not completely solidified, the upper surface of the solution might start solidifying while it is not horizontal. This makes the molding bad in shape. If an inclined mold were removed down from the molding, the mold surfaces sliding on the adjacent molds would not be vertical. This prevents the removal from being smooth. It is very easy to solve these problems by keeping the molds individually horizontal while the molds are removed from the molding.

It is preferable that the apparatus further include means for urging forward and backward into close contact at least two of the molds moving during a period of a molding step in which the molds move forward while the solution is injected into the molds.

When the solution is injected into each of the molds during the period of the molding step, the injection pressure might otherwise separate adjacent molds. This defines gaps between the molds, through which the solution may leak out. By limiting the period during which the solution is injected, and by urging the molds forward and backward into close contact, it is possible to keep the solution from leaking out through the gaps. It is therefore possible to inject the solution safely and securely.

It is preferable that the apparatus further include means for urging forward the rear end of the mold having circulated and returned to the starting point, and for urging backward the front end of the mold at the end of the forward mold movement. This urging means brings all the molds in the molding step into close contact. This makes it possible to keep the apparatus operating without preventing the molds from moving down smoothly from the molding, and from returning smoothly to the starting point of the production.

Each of the molds may include a formwork, an intermediate plate and a movable plate. The formwork has the cavities corresponding to the molding. The intermediate plate closes the lower side of the formwork and has pin holes. Each of the pins extends through one of the holes in such a manner that the pins can protrude from the holes into the cavities. The pins are embedded in the movable plate in such a manner that they extend toward the intermediate plate. The movable plate can move toward and away from the intermediate plate within a predetermined range. Otherwise, the formwork and the intermediate plate might be integral. In this case, the molds are simple in structure. The movable plate can move toward and away from the intermediate plate within the predetermined range. The pins can protrude into the cavities. It is therefore easy to handle the molds and take the molding off them.

Each of the molds may include inner rollers supported on both sides of a front portion thereof and outer rollers supported on both sides of a rear portion thereof. The apparatus may further include inner and outer guide rails for guiding the inner and outer rollers, respectively, to keep the molds horizontal and move the molds forward and gradually down. The apparatus may also include a rail and a holding roller for stopping the movable plate from moving down. One of the rail and the roller is supported by the lower side of the movable plate or along and below the guide rails. The other of the rail and the roller is supported along and below the guide rails or by the lower side of the movable plate.

While each of the molds is moved forward with its movable plate stopped from moving down by the cooperation of the holding roller and the rail, the formwork and the intermediate plate move down at the same time along the guide rails. This protrudes the pins gradually into the cavities, taking the molding off the mold.

The apparatus may further include:

a first lift for moving up and down at the end point of the forward path to move down each of the molds;

guide tracks extending in parallel to the forward path horizontally from the point where the first lift has moved the mold down, so that the guide rollers can roll on the guide tracks;

a belt conveyor extending along the guide tracks for conveying the molds; and a second lift for lifting each of the molds from the end points of the guide tracks to the starting point of the forward path.

The mold conveyed to the end point of the forward path can be moved down by the first lift, then conveyed backward along the horizontal guide tracks by the belt conveyor, and thereafter returned securely to the starting point of the forward path by the second lift.

The various features of novelty which characterize the invention are pointed out with particularity in the claims annexed to and forming part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWINGS

In the drawings:

FIG. 3(a) is a sectional view taken on the line III—III of FIG. 1;

FIG. 3(b) is a sectional view taken on the line I—I of FIG. 3(a);

DESCRIPTION OF THE PREFERRED EMBODIMENTS

Figure 2:
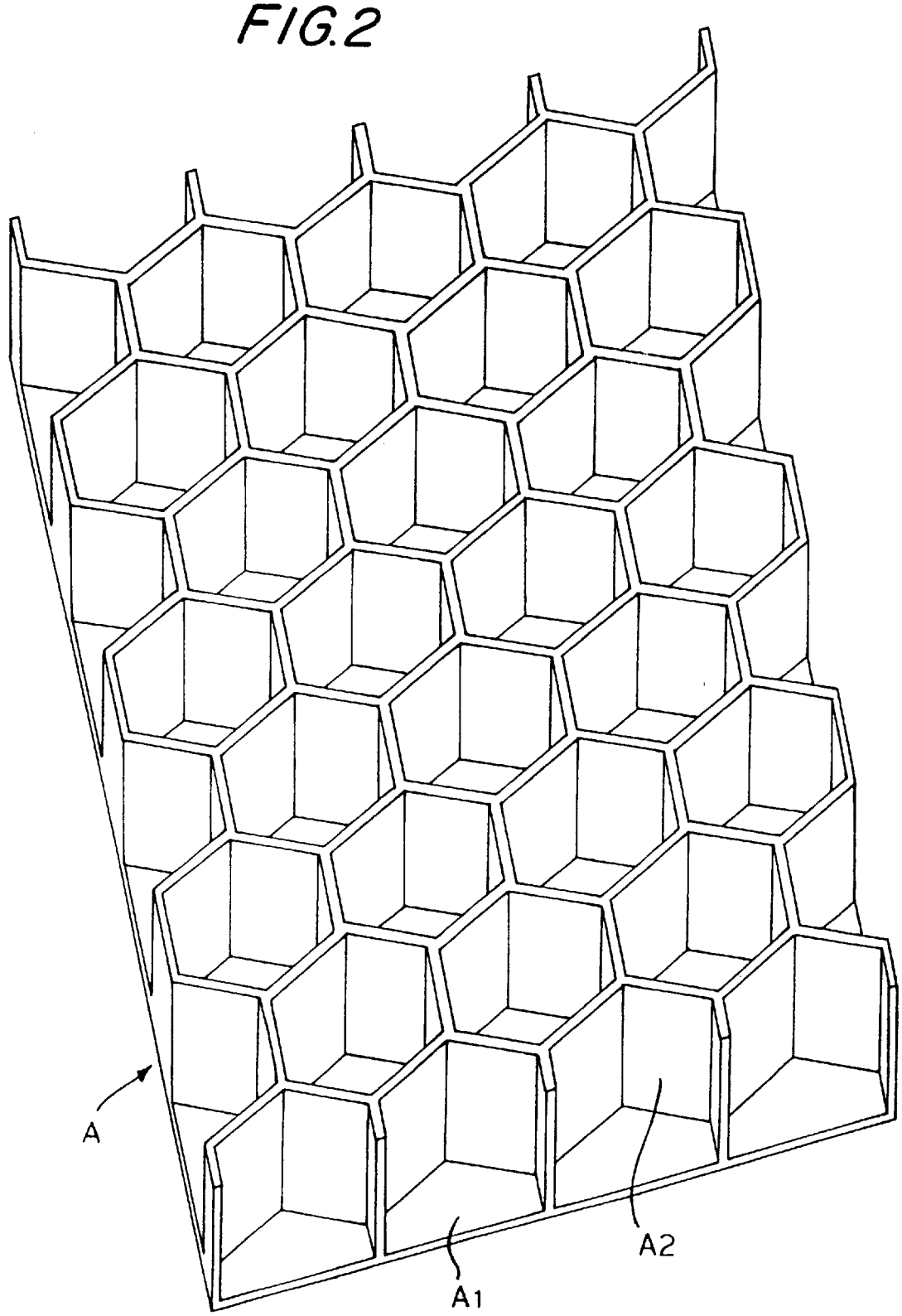
FIG. 2 is a perspective view of a honeycomb molding which can be made by the apparatus shown in FIG. 1.

Referring to FIG. 2, a honeycomb molding A is shown. The molding A has a honeycomb array of hexagonal tubes or spaces each defined by side walls A2. The spaces are closed at their tops by a ceiling or top plate A1 and open at their bottoms.

Figure 1:
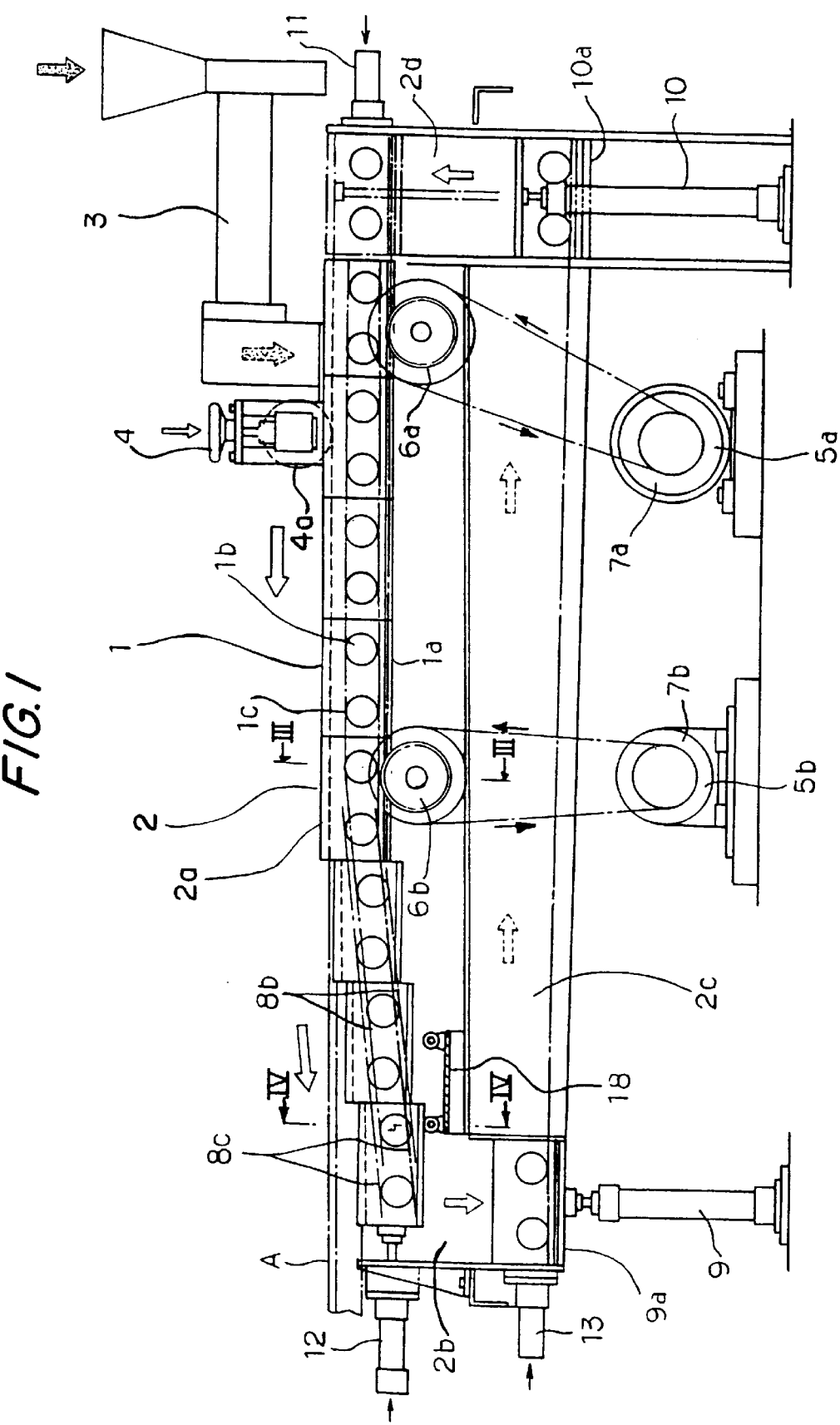
FIG. 1 is a schematic side view of an apparatus for manufacturing a molding continuously in accordance with a first embodiment of the invention.

Referring now to FIG. 1, an apparatus for continuously manufacturing the honeycomb molding A of FIG. 2 is shown. The apparatus includes an array of molds 1 shaped for the molding A and open at their tops. Each mold 1 may be 200 mm wide between its front and rear ends and 1,000 mm long. Each mold 1 has a pair of racks 1a formed on both sides of its bottom. Each mold 1 supports a pair of outer side rollers 1b on both sides of its front portion and a pair of inner side rollers 1c on both sides of its rear portion. The rollers 1b and 1c are positioned at the same level. The outer rollers 1b are offset axially from the inner rollers 1c.

The molds 1 can be circulated along an endless track 2 with their open sides up by various means in the track. The track 2 consists of a forward path 2a, a downward path 2b, a backward path 2c and an upward path 2d. An extrusion type solid solution injector 3 is positioned in an upstream portion of the forward path 2a. The injector 3 can extrude and inject a solid solution as the material for a molding A into the mold 1 moving under the injector. The solution is a fluid or otherwise flowable and may be vinyl chloride resin solution or another synthetic resin solution. A pressurizer 4 is positioned immediately downstream from (in front of) the injector 3. The pressurizer 4 can evenly and downward pressurize the solid solution in each mold 1 before the solution starts solidifying. The pressurizer 4 includes a pressure roller 4a.

A rear booster 5a includes a motor 7a and a pair of gears 6a, which can be driven by the motor 7a. A front booster 5b includes a motor 7b and a pair of gears 6b, which can be driven by the motor 7b. The gears 6a are spaced from the gears 6b by a distance nearly equaling the total length of about four molds 1. The gears 6a and 6b can mesh with the mold racks 1a. The rear motor 7a is greater in torque or higher in rotational speed than the front motor 7b. The difference in output or conveying speed between the motors 7a and 7b can apply pressing force which urges toward each other the molds 1 being driven by the boosters 5a and 5b and the molds between them.

The forward path 2a includes a pair of outer guide rails 8b and a pair of inner guide rails 8c. The rails 8b, and 8c extend in parallel on both sides of the path 2a, and can guide the side rollers 1b and 1c, respectively. While each mold 1 is moving along the forward path 2a, its rollers 1b and 1c are kept at the same level by the rails 8b and 8c, respectively, so that the mold is kept horizontal. The molds 1 can move down from the forward path 2a through the downward path 2b to the backward path 2c, through which they can move backward. The backward path 2c takes the form of a tunnel or trunk, and slopes slightly down to its rear. The molds 1 can be moved backward by their own weight through the path 2c. It is therefore not necessary to provide a special means of moving the molds 1 backward. This contributes to the saving of power.

A cylinder 11 is positioned on the inlet side of the forward path 2a. The cylinder 11 can forward push the mold 1 which has moved up through the upward path 2d and reached the rear end of the forward path 2a. A cylinder 12 is positioned on the outlet side of the forward path 2a. The cylinder 12 can backward push the mold 1 at the front end of the forward path 2a. The cylinders 11 and 12 can push the molds 1 in the forward path 2a in the opposite directions.

A cylinder 9 stands under the downward path 2b, and can vertically move a table or plate 9a, which receives the mold 1 at the front end of the forward path 2a. Cylinder 9 can move the mold 1 on the table 9a down to the inlet of the backward path 2c. A cylinder 13 is positioned on the inlet side of the backward path 2c. Cylinder 13 can push into the inlet of the backward path 2c the mold 1 moved down through the downward path 2b by the cylinder 9.

A cylinder 10 stands under the upward path 2d, and can vertically move a table or plate 10a, which receives the mold 1 at the outlet of the backward path 2c. Cylinder 10 can move the mold 1 on the table 10a up to the rear end of the forward path 2a.

Figure 4:
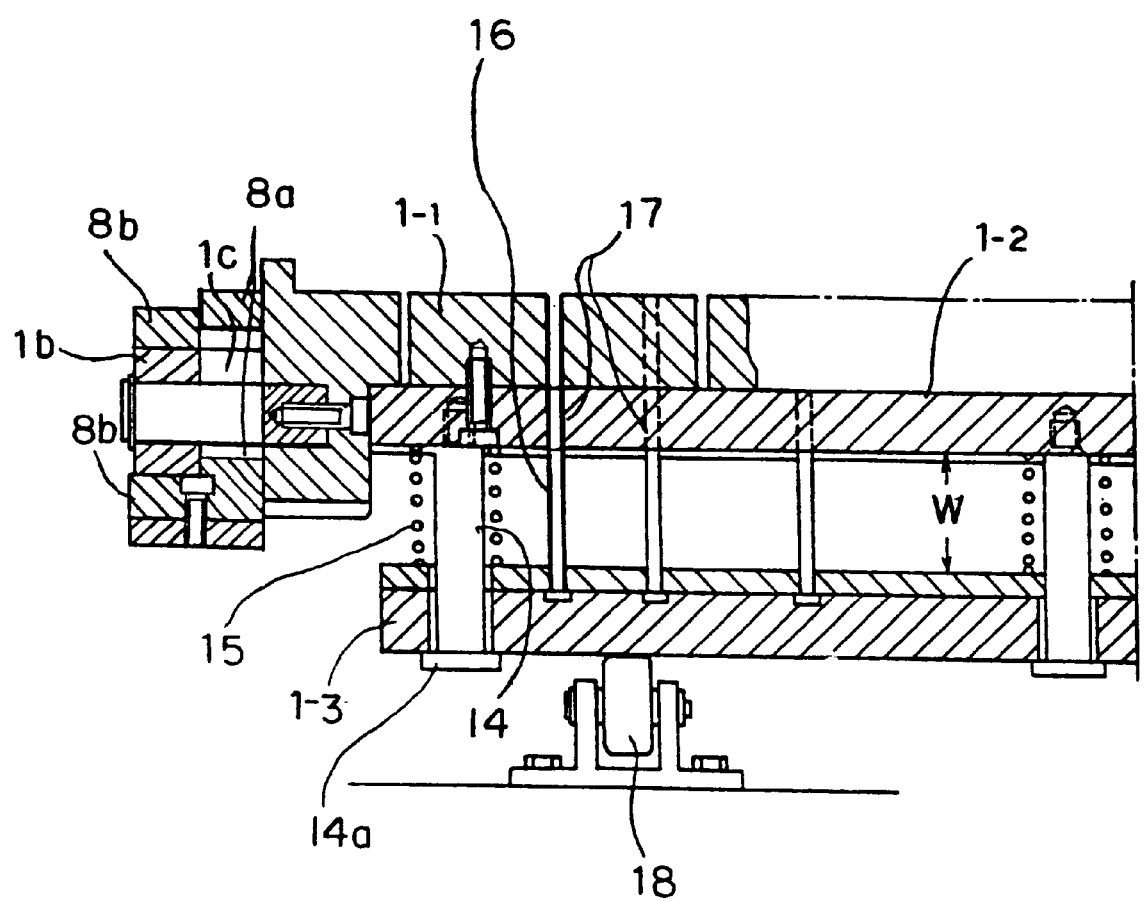
FIG. 4 is a sectional view taken on the line IV—IV of FIG. 1.

As shown in FIGS. 3 and 4, each mold 1 includes an array of hexagonal blocks 1–1a, a front row and a rear row of semi-hexagonal blocks 1–1b, and a pair of side blocks 1–1c which support the side rollers 1b and 1c. The mold 1 also includes an intermediate plate 1-2 and a bottom plate 1-3. The blocks 1–1a, 1–1b and 1–1c are bolted to the top of the intermediate plate 1–2, 2, and arranged at regular intervals in the form of a honeycomb. The intermediate plate 1-2 functions as a guide for releasing or removing the molding. The bottom plate 1-3 is positioned under the intermediate plate 1-2, and can move up and down relative to it.

Limit bolts 14 are fixed to the intermediate plate 1-2 and extend through the bottom plate 1-3. Each bolt 14 has a head 14a for limiting the range within which the space W between the plates 1-2 and 1-3 can be changed. Each bolt 14 is surrounded by a compression coil spring 15, which is interposed between the plates 1-2 and 1-3 to urge them away from each other. The intermediate plate 1-2 has pin holes 17 formed through it. Each hole 17 is aligned with the space formed among adjacent three of the blocks 1–1a, 1–1b and 1–1c. Pins 16 each have a head embedded in the bottom plate 1-3, and each extend through one of the holes 17.

Normally, as shown in FIGS. 3(a) and 4, the tops of the pins 16 are flush with the top of the intermediate plate 1-2. When the intermediate plate 1-2 moves down toward the bottom plate 1-3, the top of each pin 16 protrudes from the associated hole 17 into the space among the associated three of the mold blocks 1–1a, 1–1b, and 1–1c. The protruding pins 16 hold side walls A2 of the molding A while the blocks 1–1a, 1–1b and 1–1c and the intermediate plate 1-2 are moving down. This does not damage the molding A even if the pins 16 push it with great force, because its side walls A2 are strong.

When each mold 1 has moved to a position near the front end of the forward path 2a and is positioned quite low, the lower side of its bottom plate 1-3 comes into contact with holding rollers 18. Further downward movement of the mold 1 protrudes the tops of the pins 16 from the intermediate plate 1-2, taking out the molding A. The rollers 18 are supported at the top of the backward path 2c, but might be supported in another place.

In operation, the molds 1 circulate along the track 2. The injector 3 injects a solid solution into the mold 1 moving under it. Subsequently, the pressure roller 4a evenly pressurizes the solution which has not started solidifying yet in the mold 1. The pressure of this roller 4a is such that the honeycomb moldings formed in the molds 1 are connected by a ceiling A1 in the form of a belt which is as thin as possible. The pressurizer 4 includes an adjusting wheel for arbitrarily adjusting the thickness of the ceiling A1.

The boosters 5a and 5b urge the mold 1 in engagement with the gears 6a and the mold 1 in engagement with the gears 6b toward each other. This brings these two molds 1 and the molds between them into close contact, preventing the synthetic resin solution from being leaked between the molds by the injection pressure.

The pressurized solution in each mold 1 is cooled and solidifies to form part of a molding A. The mold 1 is removed from the molding A. The guide rails 8b and 8c keep the mold 1 horizontal. The rails 8b and 8c limit the vertical movement of the blocks 1–1a, 1–1b and 1–1c and the intermediate plate 1-2 of the mold 1 Therefore, when the mold 1 moves down, the holding rollers 18 hold its bottom plate 1-3 against the force of the springs 15. This narrows the space W between the plates 1-1 and 1-3.

The mold 1 can be removed down from the molding A by:
the bottom plate 1-3 being able to move up and down relative to the intermediate plate 1-2;
the springs 15 operating between the intermediate plate 1-2 and the bottom plate 1-3 when the bottom plate moves up and down;
the pins 16 protruding and retracting when the bottom plate 1-3 moves up and down; and
the holding rollers 18 coming into contact with the bottom plate 1-3 near the end of the removing step.

The front ends of the guide rails 8b and 8c are positioned immediately backward from the point where the removing step ends. Where the ends of the rails 8b and 8c are positioned, the bottom plate 1-3 of the mold 1 disengages from the front holding rollers 18. When the mold 1 approaches the end of the removing step, a signal is generated. In accordance with the signal, the cylinder 9 moves the table 9a up. Then, the mold 1 is transferred securely onto the table 9a, and moved with it down to the level of the inlet of the backward path 2c. Thereafter, the cylinder 13 forces the mold 1 into the inlet of this path 2c. Then, the mold 1 is moved backward by its weight through the backward path 2c. When the mold 1 reaches the bottom of the upward path 2d, it is received securely by the table 10a. The mold 1 on the table 10a is lifted to the level of the inlet of the forward path 2a by the cylinder 10.

As stated above, the cylinder 11 can forward urge the mold 1 at the rear end of the forward path 2a, while the cylinder 12 can backward urge the mold 1 at the front end of this path 2a. While these two molds 1 and the molds between them are moving along the path 2a, the cylinders 11 and 12 bring all these molds into close contact. This can keep the apparatus operating without preventing the smooth movement of the molds 1 entering and leaving the forward path 2a.

The material for the molding A may contain vinyl chloride, polyethylene or another high molecular compound, and be made into solid solution at a temperature between 120 and 70 degrees C.

Figure 6:
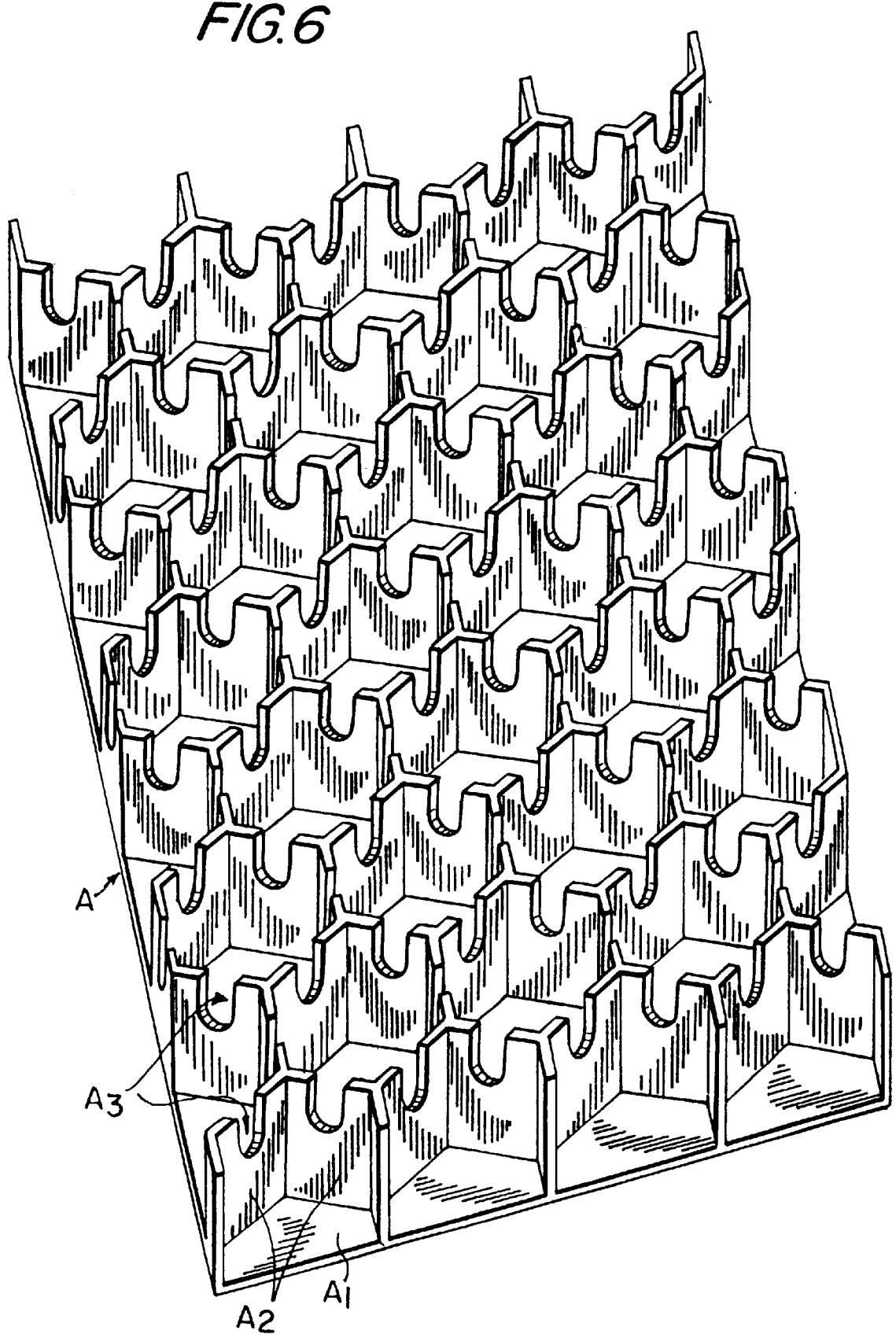
FIG. 6 is a perspective view of a honeycomb molding which can be made by the apparatus shown in FIG. 5.
Figure 7:
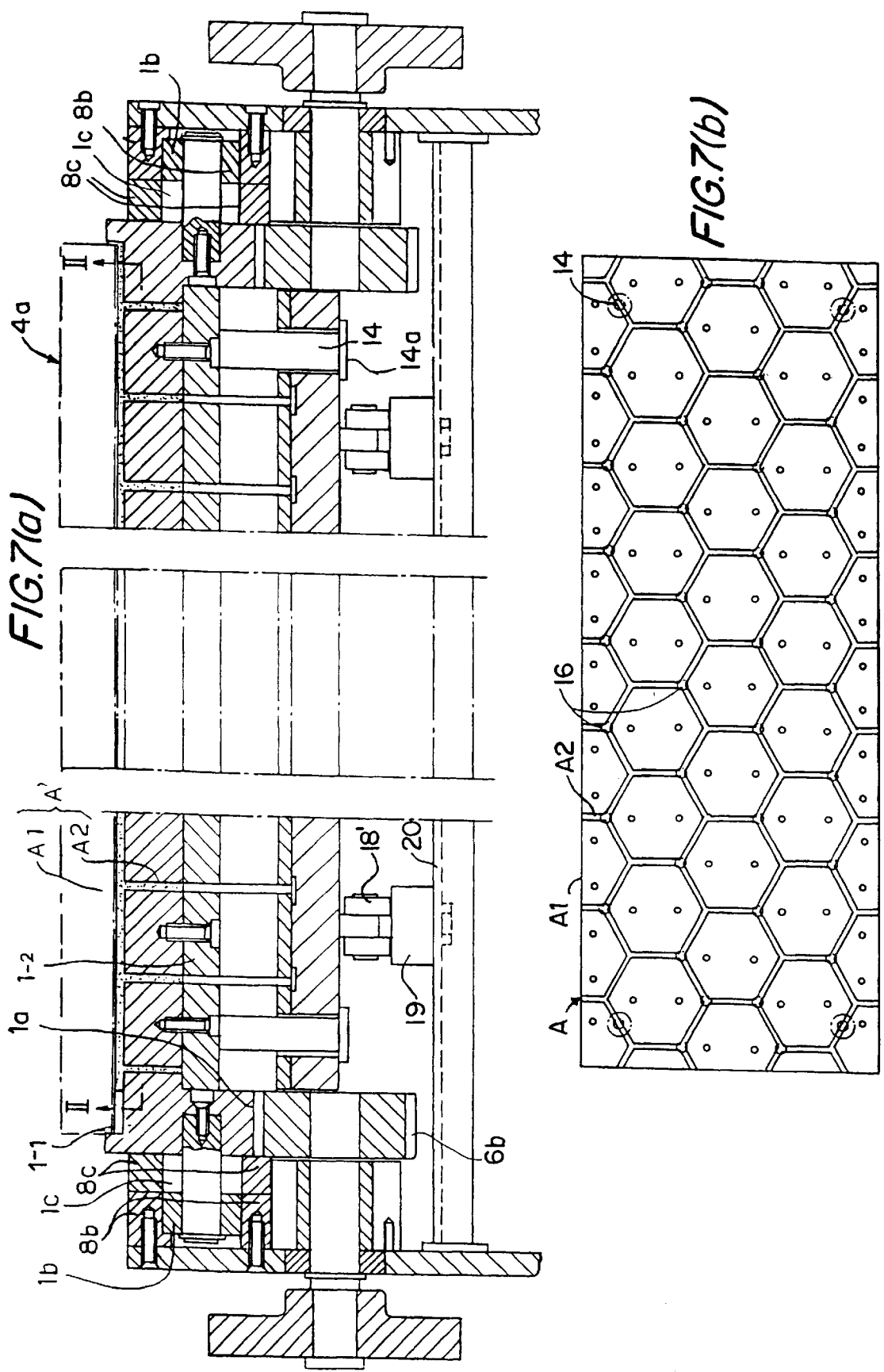
FIG. 7(a) is a sectional view taken on the line VII—VII of FIG. 5.
FIG. 7(b) is a sectional view taken on the line II—II of FIG. 7(a)
Figure 8:
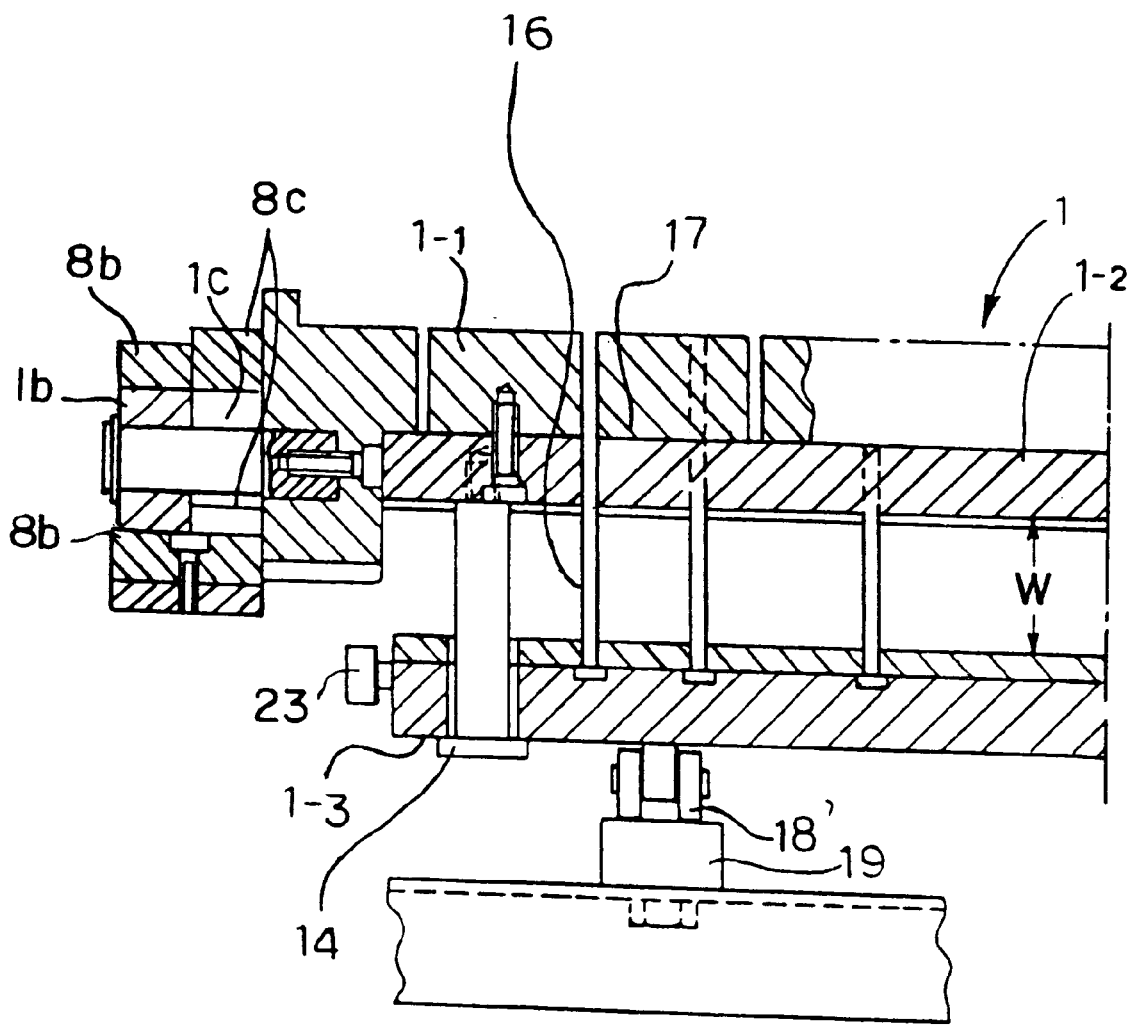
FIG. 8 is a sectional view taken on the line VIII—VIII of FIG. 5.

Referring now to FIG. 6, a honeycomb molding A' is shown. The molding A' differs from the molding A in that the walls A2 of its hexagonal spaces each have a U-shaped top recess A3. The recesses A3 of the walls A2 do not prevent the lawn roots in a lawn parking lot from extending horizontally.

Referring now to FIGS. 5, 7a, 7b and 8, these figures show an apparatus for continuously manufacturing the honeycomb molding A' of FIG. 6. The main differences between the this embodiment and the prior embodiment of the invention are discussed below. Otherwise, the embodiments are common in structure and their operations are basically common.

The molds 1' of this apparatus are shaped to form the recesses A3 in the molding A'. Each mold 1' has two pairs of bottom rollers 18' supported by the lower side of its bottom plate 1-3. Each pair of rollers 18' is spaced laterally from the other. Two horizontal rails 19 extend in parallel below the guide rails 8a and 8b, and are fixed to frames 20. Each pair of rollers 18' can roll on one of the horizontal rails 19. The rollers 18' are positioned midway between the front and rear ends of the mold 1' so that the mold can move down smoothly in the downward path 2b of the endless track 2 without sliding on adjacent parts when the rollers 18' disengage from the horizontal rails 19. The bottom plate 1-3 is not urged by springs away from the intermediate plate 1-2.

The backward path 2c of the track 2 includes horizontal guide rails 21 extending in parallel. The side rollers 1b and 1c of the molds 1' can roll on these rails 21. A belt conveyor 22 extends below and along the rails 21, and includes a belt 22a. The upper portion of the belt 22a can engage with the lateral middle of the lower side of the bottom plate 1-3 of each mold 1'. The belt 22a conveys the mold 1' to the bottom of the upward path 2d of the track 2.

Figure 5:
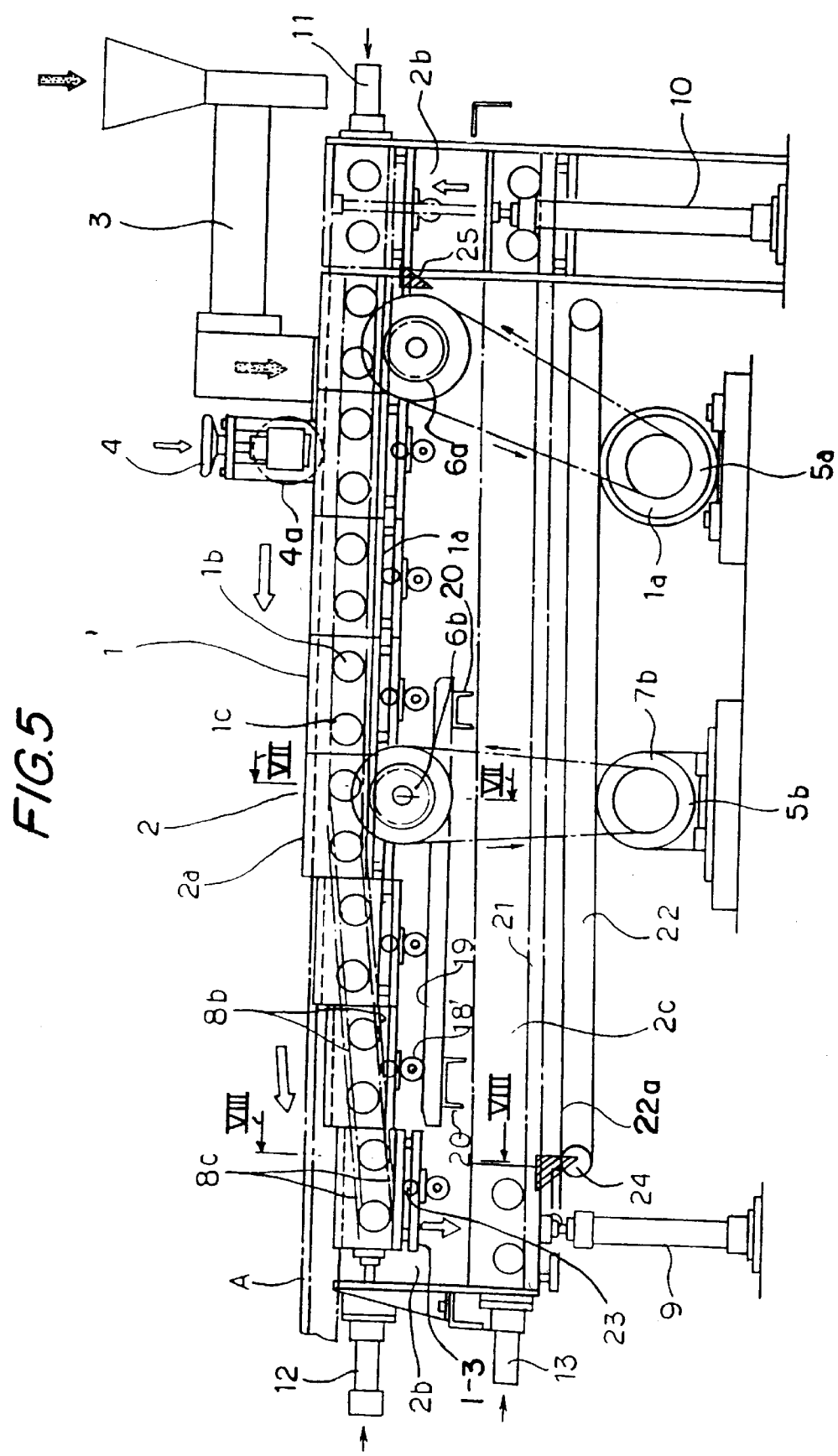
FIG. 5 is a schematic side view of an apparatus for manufacturing a molding continuously in accordance with a second embodiment of the invention.

Each mold 1' has a pair of bearing rollers 23 supported on both sides of its bottom plate 1-3. As shown in FIG. 5, two inclined guides 24 are fixed at the bottom of the downward path 2b and near the inlet of the backward path 2c. Each guide 24 has a slope for guiding one of the bearing rollers 23 along it. The guide slopes can force the bottom plate 1-3 down from the intermediate plate 1-2 in order to space them from each other. This enables the belt conveyor 22 to convey the mold 1' securely. Two other inclined guides 25 are fixed at the top of the upward path 2d and near the inlet of the forward path 2a. When each mold 1' is lifted by the cylinder 10, its bottom plate 1-3 is moved toward the intermediate plate 1-2. When the lifted mold 1' is moved forward, the guides 25 guide its bearing rollers 23 to space the bottom plate 1-3 down from the intermediate plate 1-2.

Referring now to FIG. 5, during operation the injector 3 injects a synthetic resin solution into the mold 1' moving under it. The pressure roller 4a of the pressurizer 4 subsequently evenly pressurizes the solution which has not started solidifying yet in the mold 1'. The honeycomb moldings formed in the molds 1' are connected by a ceiling A1 in the form of a belt to form a continuous molding A'.

The boosters 5a and 5b urge the mold 1 in engagement with the gears 6a and the mold 1 in engagement with the gears 6b toward each other. This brings these two molds 1 and the molds between them into close contact, preventing the synthetic resin solution from being leaked between the molds by the injection pressure. While each mold 1' is thus conveyed forward (to the left in FIG. 5), the solution in it is solidified by cooling. Subsequently, the mold 1' is removed from the molding A'.

As stated above, the horizontal rails 19 extend forward from a point near the middle of the length of the forward path 2a.While the mold 1' is conveyed along the sloping portions of the guide rails 8b and 8c, its bottom rollers 18' come into contact with the horizontal rails 19 so that its bottom plate 1-3 stops moving down. In the meantime, the mold blocks 1–1a, 1–1b and 1–1c and the intermediate plate 1-2 of the mold 1' keep moving down. This moves the intermediate plate 1-2 toward the bottom plate 1-3 to protrude the pins 16 from the intermediate plate. The protruding pins 16 push side walls A2 of the molding A' upward to take the molding off the mold 1'. In other words, while the molding A' is moving forward and horizontally without changing its vertical position, the mold 1' is removed down from the molding.

After the bottom rollers 18' of the mold 1' leave the horizontal rails 19, the mold moves down along the downward path 2b. While the mold 1' is moving down, it is kept substantially horizontal by the rollers 18'. After the side rollers 1b and 1c of the mold 1' reach the horizontal guide rails 21, its bearing rollers 23 are guided by the inclined guides 24. This spaces the bottom plate 1-3 of the mold 1' down from the intermediate plate 1-2 to bring the bottom plate into engagement with the conveyor belt 22a. The belt conveyor 22 conveys the mold 1' along the backward path 2c.

After the mold 1' reaches the upward path 2d, it is lifted along this path by the cylinder 10 and returns to the starting point of the forward path 2a. When the mold 1' is pushed into the forward path 2a by the cylinder 11, the inclined guides 25 guide the bearing rollers 23 to force the bottom plate 1-3 downward from the intermediate plate 1-2. This returns the mold 1' to its original condition. The foregoing operation is repeated with the molds 1' circulated along the track 2 to form a continuous molding A'.

The mold blocks 1–1a, 1–1b and 1–1c of each mold 1 or 1'might be integral with the intermediate plate 1-2 of the mold.

While specific embodiments of the invention have been shown and described in detail to illustrate the inventive principles, it will be understood that the invention may be embodied otherwise without departing from such principles.

What is claimed is:

1. An apparatus for manufacturing a continuous molding continuously by injecting a solid solution in order of precedence into a plurality of molds circulating in a line along an endless track, and by solidifying the injected solution, the molds each including a plurality of pins which can protrude up into cavities in the mold, the continuous molding consisting of a number of moldings connected end to end by a molded top plate, the moldings being open at their bottoms, the apparatus comprising:

conveying means for horizontally conveying the molds in contact with each other and in series along the track;

injecting means for injecting the solution into each of the molds moving forward along the track, the injecting means being positioned above the starting point where the conveying means starts conveying the molds;

a pressurizer for pressing the upper surface of the injected solution with a predetermined pressure to make the surface continuously flat, the pressurizer being positioned adjacently to and downstream from the injecting means;

guide means for guiding the molds down by using the conveying force;

removing means for protruding the pins up as the molds are moving down; and circulating means for circulating to the starting point the molds removed from the molding.

2. An apparatus according to claim 1, wherein each of the molds includes rollers which can be guided by the guide means in such a manner that, while the mold is moving forward along the guide means and gradually down out of close contact with the molding, the mold is kept horizontal.

3. An apparatus according to claim 1, further comprising means for urging forward and backward into contact with each other at least two of the molds moving during a period of a molding step in which the molds move forward while the solution is injected into the molds.

4. An apparatus according to claim 1, further comprising means for urging forward the rear end of the mold having circulated and returned to the starting point, and for urging backward the front end of the mold at the end of the forward mold movement.

5. An apparatus according to claim 1, wherein each of the molds includes:

a formwork having the cavities corresponding to the molding;

an intermediate plate closing the lower side of the formwork and having pin holes, each of the pins extending through one of the holes in such a manner that the pins can protrude from the holes into the cavities; and a movable plate in which the pins are embedded in such a manner that the pins extend toward the intermediate plate, the movable plate being able to move toward and away from the intermediate plate within a predetermined range.

6. An apparatus according to claim 2, further comprising means for urging forward and backward into contact with each other at least two of the molds moving during a period of a molding step in which the molds move forward while the solution is injected into the molds.

7. An apparatus according to claim 2, further comprising means for urging forward the rear end of the mold having circulated and returned to the starting point, and for urging backward the front end of the mold at the end of the forward mold movement.

8. An apparatus according to claim 2, wherein each of the molds includes inner rollers supported on both sides of a front portion thereof and outer rollers supported on both sides of a rear portion thereof, the apparatus further comprising:

inner and outer guide rails for guiding the inner and outer rollers, respectively, to keep the molds horizontal and move the molds forward and down; and a rail and a holding roller for stopping the movable plate from a moving down, one of the rail and the holding roller being supported by the lower side of the movable plate or along and below the guide rails, and the other being supported along and below the guide rails or by the lower side of the movable plate.

9. An apparatus according to claim 2, and further comprising:

a first lift for moving up and down at the end point of the forward path to move down each of the molds, guide tracks extending in parallel to the forward path horizontally from the point where the first lift has moved the mold down, so that the guide rollers can roll on the guide tracks;

a belt conveyor extending along the guide tracks for conveying the molds; and a second lift for lifting each of the molds from the end points of the guide tracks to the starting point of the forward path.

10. An apparatus according to claim 5, wherein each of the molds includes inner rollers supported on both sides of a front portion thereof and outer rollers supported on both sides of a rear portion thereof, the apparatus further comprising:

inner and outer guide rails for guiding the inner and outer rollers, respectively, to keep the molds horizontal and move the molds forward and down; and a rail and a holding roller for stopping the movable plate from a moving down, one of the rail and the holding roller being supported by the lower side of the movable plate or along and below the guide rails, and the other being supported along and below the guide rails or by the lower side of the movable plate.

11. An apparatus according to claim 8, and further comprising:

a first lift for moving up and down at the end point of the forward path to move down each of the molds, guide tracks extending in parallel to the forward path horizontally from the point where the first lift has moved the mold down, so that the guide rollers can roll on the guide tracks;

a belt conveyor extending along the guide tracks for conveying the molds; and a second lift for lifting each of the molds from the end points of the guide tracks to the starting point of the forward path.

12. An apparatus according to claim 10, and further comprising:

a first lift for moving up and down at the end point of the forward path to move down each of the molds, guide tracks extending in parallel to the forward path horizontally from the point where the first lift has moved the mold down, so that the guide rollers can roll on the guide tracks;

a belt conveyor extending along the guide tracks for conveying the molds; and a second lift for lifting each of the molds from the end points of the guide tracks to the starting point of the forward path.

* * * * *